C. Wheeler Jr.

Harvester Cutter.

No. 2594 Reissued May 7, 1867.

Witnesses.
A. Moore
Jno. D. Patten

Inventors.
C. Wheeler Jr.
By atty. A. B. Straughan.

United States Patent Office.

C. WHEELER, JR., OF POPLAR RIDGE, NEW YORK.

*Letters Patent No.* 15,677, *dated September* 2, 1856; *reissue No.* 2,594, *dated May* 7, 1867.

IMPROVED CUTTING DEVICE FOR HARVESTERS.

The Schedule referred to in these Letters Patent and making part of the same.

TO ALL WHOM IT MAY CONCERN:

Be it known that I, C. WHEELER, Jr., of Poplar Ridge, in the county of Cayuga, and State of New York, have invented a new and useful improvement in Cutting Devices for Harvesters; and I do hereby declare the following to be a full, clear, and exact description of the same, reference being had to the accompanying drawings, making a part of this specification, in which—

Figures 4 and 5 are cross-sections through the guard, taken respectively at the red lines *x x* and *y y* of fig. 3; and Figure 6 represents a top plan of a portion of the ledger-plate detached from the guard.

The nature of this invention relates, first, to the arrangement of a ledger-plate with a guard-finger so as to use it in a cutting apparatus that has a scalloped cutter, the rear part of which and the bar to which they are fastened, when in operative position, are over the finger-bar, and in providing plates resting on the finger-bar as supports or bearings for the projections of the cutters, and prevent them from bearing directly on the finger-bar. It further relates to the forming of a recess in the upper surface of the guard-finger, extending from the finger-bar to the point of intersection of the cap piece, and to the manner of locking the ledger-plate laterally to prevent it from moving in that direction. It further relates to the combination of the ledger-plate, guard-finger, and its cap piece, so as to form the slot, through which the cutter vibrates, wider at its rear than at its front end; and it further relates to the supporting of the rear end of the cap of the guard by uniting it to the body of the guard behind the finger-bar, and having an open space between the cap and finger-bar for the operation of the cutter.

To enable others skilled in the art to make and use my invention, I will proceed to describe the same with reference to the drawings.

Figure 1:
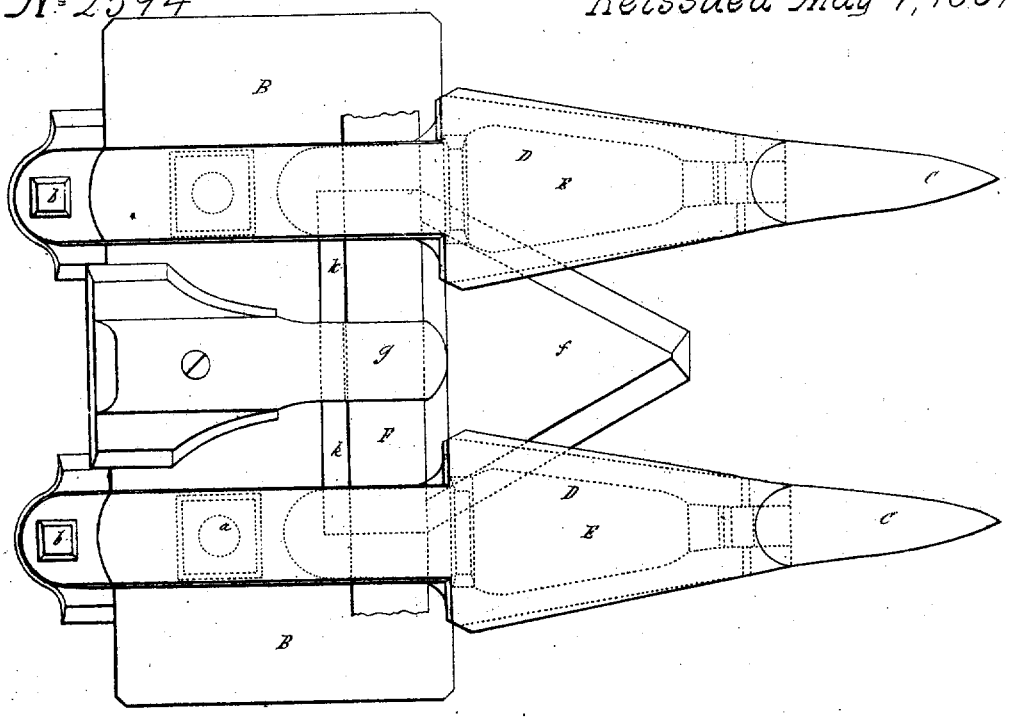
Figure 1 represents a top plan of a portion of the finger-bar and cutting apparatus.
Figure 2:
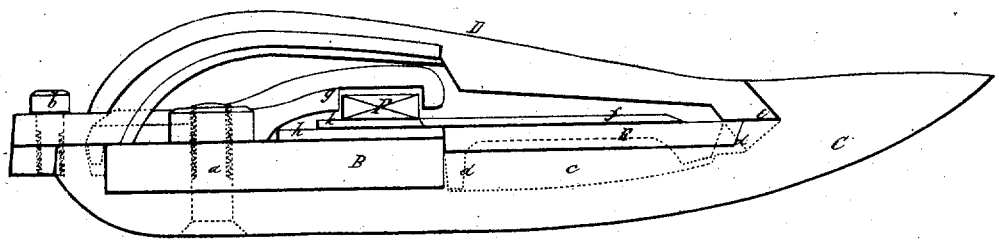
Figure 2 represents an end view thereof.
Figure 3:
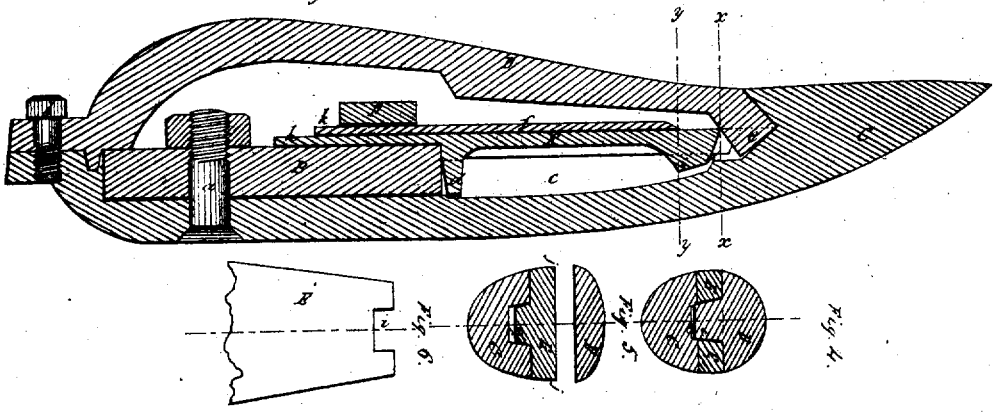
Figure 3 represents a longitudinal section through one of the guards.

B represents the finger-bar, which I propose to construct of iron. The fingers C are attached to the finger-bar B by bolts *a* passing vertically through said bar, one bolt through each finger. The back ends of the fingers C extend upwards, and so bear against the bar B as that one bolt *a* is sufficient to secure each guard-finger to the bar. The front end of each guard-finger is notched in a dove-tailed manner to receive the front end of the cap D, which is of a curved or arched form, as clearly seen in figs. 2 and 3, and the back ends of these guard-fingers, or rather the caps thereof, are secured by bolts *b*. The front parts of the guard-fingers, on their upper surfaces and underneath where the ledger-plate E lies, have each a longitudinal groove or recess, *c*, made in them, and these grooves or recesses receive the projections *d* on the under side of the ledger-plates E respectively, which rest upon the guard-fingers, the back ends *h* of said plates projecting over and resting upon the finger-bar, as shown in the drawings, figs. 1, 2, 3. The front ends of the caps D have projections *e* on them, which pass through the open mortise *i* in the front ends of the ledger-plates E, and then enter the grooves or recesses *c* in the fingers or guards C, thus holding themselves and the ledger-plates E firmly to the guard-finger at that end. The plates E have their edges *j j* slightly bevelled, as shown at fig. 5, so as to form cutting edges at their upper surfaces to make, in connection with the scalloped sickles, *f*, a shear cut for severing the stalks between them; and the upper surfaces of the ledger-plates E may be faced with steel or they may be cast of hard metal. The sickle-bar F is furnished with triangular or scalloped-shaped teeth or cutters, *f*, and works in, through, or under guides *g* attached to the upper surface of the finger-bar B, as shown in figs. 1 and 2. The cutting edges of the sickles terminate at or near the front edge of the finger-bar. The caps D are sufficiently curved or arched to allow the sickle-bar F to work freely underneath them, and also to clear the nuts of the bolts *a*. The heels *k* of the sickles *f* rest and work on the rear parts *h* of the plates E, which keep the sickles free from contact with the finger-bar, but allow the cutting edges of the teeth or sickles to work close over the cutting edges of the ledger-plates E, and to form with them a shear and clean cut.

The advantages of my improvement, as has been fully proven in practice, are, first, the fingers and caps, connected and attached to the finger-bar, as shown, possess a great degree of strength with small weight of metal, and either may be readily removed and replaced by others should they be broken; second, the plates E are conveniently removed to be ground when necessary, or to be replaced by new ones, if new ones should be required; third, by locking the caps and guard-fingers together, as shown, their construction is much facilitated and cheapened; fourth, by attaching the guard-fingers to the finger-bar in the manner shown, one bolt will hold each guard firmly in place, whilst the nut does not obstruct the free passage of the cut grass or grain over the finger-bar; fifth, by placing the sickles or cutting teeth on the top of the finger-bar, as shown, the cut grass or grain has only the breadth of the finger-bar to pass over, and the free passage of the grass or grain over the bar is insured; sixth, by giving the caps a curved or arched form, in addition to their strength they assist in raising lodged or tangled grass in their passage through it, and give the sickles or cutter a better chance to operate freely without clogging; seventh, the plan shown of fitting and holding the ledger-plates to the guard-finger obviates the necessity of bolts, rivets, or other separate fastenings for holding them in place.

Having thus fully described my invention, what I claim therein as new, and desire to secure by Letters Patent, is—

I claim, in combination with the guard-finger, ledger-plate, and scalloped cutter, as described, the plate resting on the finger-bar as a bearing for the rear projections of the cutters, and to give an open space between the cutters and finger-bar for the passage of dirt and grit, substantially as described.

I also claim, in combination with a ledger-plate, a guard-finger having a rigid cap and an open space behind the cutters, a recess in the body of the guard extending from the point of connection of the cap with the body of the finger back to the finger-bar, substantially as described.

I also claim the ledger-plate locked with the guard-finger by projections on the under side of the plate, so as to prevent lateral movement, in combination with the ledge, to prevent vertical movement at its front end, substantially as described.

I also claim the combination of the ledger-plate with the guard-finger so as to make a finger having a slot through which the cutter vibrates that is wider vertically at its back than at its front end, and that has an enlarged opening in rear of the cutter-bar for the discharge of grit, fibre, &c., substantially as described.

I also claim arching the cap of the guard-finger and extending it back and uniting it to the body of the guard-finger in the rear of the finger-bar, so as to form an open space between it and the finger-bar for the knife-bar and the rear part of the cutters to operate in, substantially as described.

C. WHEELER, Jr.

Witnesses:
A. B. Stoughton,
Edm. F. Brown.